US 7,725,723 B2

(12) United States Patent
Landrock et al.

(10) Patent No.: US 7,725,723 B2
(45) Date of Patent: May 25, 2010

(54) DATA CERTIFICATION METHOD AND APPARATUS

(76) Inventors: Peter Landrock, 52 Stoney's Way, Cambridge, Cambridgeshire, CB30DX (GB); Jonathan Roshan Tuliani, 206 The Rowans, Milton, Cambridge, Cambridgeshire, CB4 6ZL (GB)

( * ) Notice: Subject to any disclaimer, the term of this patent is extended or adjusted under 35 U.S.C. 154(b) by 977 days.

(21) Appl. No.: 10/486,487

(22) PCT Filed: Aug. 12, 2002

(86) PCT No.: PCT/GB02/03707

§ 371 (c)(1), (2), (4) Date: Aug. 4, 2004

(87) PCT Pub. No.: WO03/015370

PCT Pub. Date: Feb. 20, 2003

(65) Prior Publication Data
US 2005/0010758 A1    Jan. 13, 2005

(30) Foreign Application Priority Data
Aug. 10, 2001 (GB) ................................. 0119629.4

(51) Int. Cl.
*H04L 9/32* (2006.01)
(52) U.S. Cl. ..................................................... 713/176
(58) Field of Classification Search ................. 713/186, 713/176
See application file for complete search history.

(56) References Cited

U.S. PATENT DOCUMENTS

| 5,208,858 | A |   | 5/1993 | Vollert et al. |       |
|-----------|---|---|--------|----------------|-------|
| 5,418,854 | A |   | 5/1995 | Kaufman et al. |       |
| 5,491,752 | A |   | 2/1996 | Kaufman et al. |       |
| 5,638,446 | A | * | 6/1997 | Rubin ............ | 705/51 |

(Continued)

FOREIGN PATENT DOCUMENTS

EP    0813132 A2    5/1997

(Continued)

OTHER PUBLICATIONS

Torben Pedersen: "Signature Servers", Newsonink, [Online] Jan. 2001, http://www.cryptomathic.com/pdf/neWs5.pdf.

(Continued)

*Primary Examiner*—Nasser Moazzami
*Assistant Examiner*—Michael S McNally
(74) *Attorney, Agent, or Firm*—Cesari and McKenna, LLP

(57) ABSTRACT

An apparatus and method for signing electronic data with a digital signature in which a central server comprises a signature server (110) and an authentication server (120). The signature server (110) securely stores the private cryptographic keys of a number of users (102). The user (102) contacts the central server using a workstation (101) through a secure channel which is setup for the purpose. The user (102) supplies a password or other token (190), based on information previously supplied to the user by the authentication server (120) through a separate authentication channel. The authentication server provides the signature server with a derived version of the same information through a permanent secure channel between the servers, which is compared with the one supplied by the user (102). If they match, data received from the user (102) is signed with the user's private key.

68 Claims, 5 Drawing Sheets

U.S. PATENT DOCUMENTS

| | | | |
|---|---|---|---|
| 5,668,876 A * | 9/1997 | Falk et al. | 380/271 |
| 5,748,738 A | 5/1998 | Bisbee et al. | |
| 5,966,445 A * | 10/1999 | Park et al. | 713/180 |
| 5,982,898 A | 11/1999 | Hsu et al. | |
| 6,006,256 A * | 12/1999 | Zdepski et al. | 725/114 |
| 6,058,480 A | 5/2000 | Brown | |
| 6,078,908 A * | 6/2000 | Schmitz | 705/50 |
| 6,745,327 B1 * | 6/2004 | Messing | 713/170 |
| 7,085,931 B1 | 8/2006 | Smith et al. | |
| 7,210,037 B2 * | 4/2007 | Samar | 713/176 |
| 2001/0002485 A1 * | 5/2001 | Bisbee et al. | 713/167 |
| 2002/0002678 A1 * | 1/2002 | Chow et al. | 713/169 |
| 2002/0042879 A1 * | 4/2002 | Gould et al. | 713/176 |
| 2002/0078355 A1 | 6/2002 | Samar | |
| 2002/0095507 A1 * | 7/2002 | Jerdonek | 709/229 |
| 2002/0095569 A1 * | 7/2002 | Jerdonek | 713/155 |
| 2003/0093678 A1 | 5/2003 | Bowe et al. | |
| 2003/0105966 A1 * | 6/2003 | Pu et al. | 713/186 |

FOREIGN PATENT DOCUMENTS

| | | |
|---|---|---|
| EP | 0803789 A2 | 10/1997 |
| EP | 0936530 A1 | 8/1999 |
| EP | 1102157 A1 | 11/1999 |
| EP | 1039420 A2 | 1/2000 |
| EP | 1 030 282 A1 | 8/2000 |
| WO | WO 97/31306 | 8/1997 |
| WO | WO 99/21321 | 4/1999 |
| WO | WO 00/10286 | 2/2000 |
| WO | WO 0072502 A1 | 11/2000 |
| WO | WO 01/18635 A2 | 3/2001 |
| WO | WO 0117310 A1 | 8/2001 |
| WO | WO 02/48848 A2 | 6/2002 |
| WO | WO 02/058357 A2 | 7/2002 |

OTHER PUBLICATIONS

Cryptomathic: Home Page Cryptomathic Wed Site, May 18, 2001, http://web.archive.org/web/2001 051817081 0/http://www.cryptomathic.com.

Cryptomathic: "EasySign—A User Friendly Way of doing Mobile Commerce", Cryptomathic Website, Aug. 6, 2001, http://web.archive.org/web/2001 080615 1 906/http:www.cryptomathic.com/products/easysign.html.

Cryptomathic: "A New Approach to Digital Signatures", Cryptomathic website, Aug. 1, 2001, http://www.cryptomathic.com/company/sigserv.html.

Garfinkel Simson et al: Web Security & Commerce, Jun. 1997, pp. 108-111.

Holloway CJ, "Controlling Digital Signature Services Using a Smartcard", Computers & Security International Journal Devoted to the Study of Technical and Financial Aspects of Computer Security, Elsevier Science Publishers, Amsterdamn, NL, vol. 14, No. 8, 1995, pp. 681-690.

Letter dated Apr. 5, 2004 from F.R. Kelly & Co. To European Patent Office with Enclosures.

"Virtual Smart Card Server Solution", published by Secure Computing Corporation, Jul. 2000, 3 pages.

Kessler, Gary C. "Roaming PKIs: Harbinger of Virtual VPNs", Information Security Magazine, published Feb. 2000, 4 pages.

Smith, Richard. "Authentication: From Passwords to Public Keys", first printing Oct. 2001, 4 pages.

Rigne et al. "Remote Authentication Dial in User Service", RFC 2058, published by Network Working Group, Apr. 1997, 29 pages.

Frank et al. "HTTP Authentication: Basic and Digest Access Authentication", RFC 2617, published by Network Working Group, Jun. 1999, 15 pages.

Källström, Olle. "Business Solutions for Mobile E-commerce", Ericsson Review No. 2, 2000, 7 pages.

Rivest et al., "A Method for Obtaining Digital Signatures and Public-key Cryptosystems", Communications of the ACM, Feb. 1978, vol. 21, No. 2, pp. 120-126.

Landrock, Peter, "Interactive Identification Protocols (Transcript of Discussion)", Lecture Notes in Computer Science, Jan. 1, 2001, Springer Berlin, pp. 43-48.

"Authentication in an Electronic Banking Environment", Federal Financial Institutions Examination Council, Washington, DC, Aug. 8, 2001, 12 pages.

"Jyste Netbank—Kom godt I gang", Jyske Bank, Apr. 1998, 8 pages.

Munk, Stephanie, "Et foredrag om kryptografi", daimposten, Oct. 1998, 2 pages.

"ActivCard Synchronous Authentication", Copyright ActivCard 1997, 13 pages.

* cited by examiner

DATA CERTIFICATION METHOD AND APPARATUS

The present invention relates to the certification of data sent over a network, more specifically over an insecure network such as the Internet by cryptographic means, Whenever information is transmitted across an insecure network, there is the possibility that this may be intercepted and interfered with in some way. Therefore, many activities carried out using such a network to connect the parties involved in the activity require each party to confirm the identity of the other party(s). This is particularly the case with activities conducted over the Internet.

One way of meeting the above requirement is to use a digital signature. The origin of data sent across an insecure network can be authenticated using such a digital signature.

Such a signature fulfils the roles of a traditional signature: to provide authentication of origin, and may also have legal significance. It is therefore important to ensure that it is difficult, if not impossible, to sign an electronic document fraudulently, in order to suggest an incorrect point of origin.

A generally accepted—and the only known—way of achieving this is to use cryptography. In particular, a form of asymmetric cryptography called a public key scheme is used A public key scheme employs two different but mathematically related "keys". Such asymmetric keys work by using a so called "one way" algorithm. Such an algorithm can be used to produce a so-called digital signature with one key and verify this with the other key, but it is very time-consuming and in fact practically infeasible, with the right choice of key size, to use the verifying key to generate the signature. Currently it is a very simple matter to use the verification key to verify the signature and hence the integrity and origin of the message, and this is how each key pair is normally used. These public key schemes may either be based on so called one-way functions, where the verification process involves checking a mathematical equation (e.g. ElGamal, elliptic curves, etc. see Menezes, A, Oorschot, P. van, and Vanstone, S., Handbook of Applied Cryptography, CRC, 1996, the contents of which are incorporated herein by reference) or on encryption-decryption functions (e.g. RSA, see Rivest, R. L., Shamir, A. and Adleman, L, A method for Obtaining Digital Signatures of Public Key Cryptosystems, Communications of the ACM, 21 (2), 1978: 120-126, the contents of which are incorporated herein by reference). The latter differs from symmetric encryption, where the same key is used to both encrypt and decrypt a message. One of the advantages of such asymmetric methods is that even if a third party is in possession of the key used to verify the message they cannot produce the signature without the other key. If an encryption-decryption scheme is used, the encryption key is the verifying key and the decryption key is the signing key.

The most widely used public scheme, RSA, makes use of two very large prime numbers, and the fact that, at the time of writing, it takes a very long time to factor the product of these two primes back into the two original numbers. With sufficiently large numbers, RSA can therefore be highly resistant to signature falsification. Generally, one of the keys is the product n of the two prime factors pa and q and a so-called public exponent e, and the other is a number derived from the pair of primes and e using modular arithmetic. The public exponent e must be chosen as mutually prime to p−1 and q−1, and a secret exponent d may then be derived e.g. as the smallest positive integer satisfying $ed - x(p-1)(q-1) = 1$ for some x using Euclid's algorithm repeatedly. Further information on this may be found in Menezes et al, mentioned above.

Because knowledge of the key used for verification does not enable signing, it is possible to broadcast this key (the so called "public key") as widely as possible, to as many people as possible, typically by providing a so-called Public Key Infrastructure (PKI, see CCITT (Consultative Comm. on Intern. Telegraphy and Telephony), Recommendation X.509: The Directory—Authentication Framework, 1994, and Public Key Infrastructure: The PKIX Reference Implementation, Internet Task Engineering Force, both of which are incorporated herein by reference) so that anyone can make use of it.

If a particular public key can be used to verify a message, this shows that the originator of the message must have been the user holding the private key. It is therefore possible to indicate the origin of a particular message by making use of public key schemes.

However, this therefore requires that there is some scheme in place to bind the identity of the user to a particular public key pair For example, the holder could simply announce that he owns the public/private key pair to the world. However, the recipient of the signed document would then only have the word of the holder as to his identity and that the holder is the owner, and that the key has not been compromised. In this case, the recipient of the message cannot verify that the sender of the message is being truthful about their identity or ownership status, only that the message has come from someone claiming a particular identity and claiming to be the owner of the key pair.

Because of the above problems of verification of the identity and status of PKI key owners, third parties called Certification Authorities (CAs) have evolved to certify that a particular user is who they claim to be. The user must supply certain credentials to the CA and his public key, and the CA in return issues a so-called certificate, which is nothing but a signature generated by the CA on a message in a chosen format, such as X.509v3, consisting of the user's credentials and his public key. In addition, the CA must make a Directory available, from which the status of any user key can be communicated to any other user at any time, either by use of so-called revocation lists, or by online inquiry. Furthermore, the CA issues a Certificate Policy Statement, which states the rules for the users of the system, including the method by which the users have been identified. For details see CCITT, and Public Key Infrastructure: The PKIX Reference Implementation, mentioned above.

A digital certificate, comprising a public key/private key pair has additional advantages over a traditional signature solution without certificates in that it may have a limited operational period and may also be suspended or revoked, should the private key of the user be compromised, for example by being made available to a third party. In order for the signature to be of any use, it must preferably be represented in a standardised format, such as Public Key Crypto Standard (PKCS#1) signatures, formatted according to CMS (the Cryptographic Message Syntax) (PKCS#7, for further information on which see PKCS #1,7, RSA Cryptography Standard, RSA Laboratories, 2001, the contents of which are incorporated herein by reference).

As can be seen from above, it is vitally important that the private key of a signature be kept secure at all times, otherwise its value is removed, as its value lies in the fact that it certifies the identity of the author of a message by showing that the message originated from the owner of a particular key pair. This is only the case where the private key has not been compromised. Therefore, steps must be taken to maintain the security of the private key.

One established approach to the protection of the private key of a key pair used for digital signatures is to use software solutions and then store it on the owner's workstation or a floppy disk protected by a pincode or passphrase controlled by the owner. However, it is generally agreed that such a software-only solution is not sufficiently secure for high value transactions, unless the workstation is extraordinarily well protected. This is because it will typically be possible to recover the private key using an exhaustive search for the password on the workstation, and in any case, it is difficult to protect the private key from so-called "Trojan horse" attacks. Here a malicious programme, a type of virus, is installed by an intruder, e.g. via an e-mail which contains an executable file, and this programme secretly copies the private key of the user when it is being used in the signature process, or it secretly copies the passphrase used to protect the private key. Measures can be introduced which make such attacks more difficult, but even so, they are still not easily prevented. For security and applicability reasons the physical protection offered by smartcards, which in addition provide a mobile solution, is attractive. The disadvantage of his method is that it requires smartcard readers, which are still not widely available.

An alternative, which for a long time was considered very attractive, is instead to store the private key on a smartcard (chipcard). But this requires that the workstation used for the application must have a smartcard reader attached. As workstations very rarely have such a reader built-in as standard, and as there is no single dominating standard for communicating with the chipcard, the only possibility is to attach an extend unit and install a driver on the workstation, which is both time consuming and expensive.

Identification and security are major issues for solutions that allow the user to generate a digital signature. It is therefore an object of this invention to remove or ameliorate at least one of the problems associated with the prior art. In particular, an object is to reach a high security level, while at the same time give a flexible solution to the problem.

In addition, private keys stored on a workstation may appear "in the clear", that is in a non-encrypted form, in the user's computer's cache or printer cache or spooler, or otherwise on an Internet Service Provider (ISP) cache, even if deleted from the user's computer. In fact, even deleted items can be recovered from a computer using specialised techniques to recover data from hard disk drives etc. Indeed, whenever the private key is used for signature generation, it has to be provided in unprotected form.

Other solutions to the security problem allow the user to download their private key from a central server and generate the signature on the workstation in software. This yields the mobility but it is still vulnerable to attacks if the workstation is insecure, which it typically is unless there are restrictions on which workstations can be used to download the private key.

In an embodiment of the present invention, the private key of the user is stored centrally on a certifying apparatus consisting of one of more servers—not necessarily all at the same physical site. The servers are tamper resistant, typically employing a Hardware Security Module (HSM) such as an IBM 4758 with a limited command set available. One of these servers, called the signature server, contains the private keys of different users, initiated in such a way that only the rightful owner can initiate signature generation with his own private key.

According to the invention there is provided a method of certifying data supplied by a user by generating a digital signature or similar on this data at his control by means of his private key, the method comprising receiving the data to be certified at a certifying apparatus from a source device, certifying the data at the certifying apparatus with one or more elements of information secure to the certifying apparatus, said elements being unique to the user and outputting the data so certified from the certifying apparatus, for passing to a recipient device, wherein the elements of secure information certify that the supplier of the data is the user.

The above method provides advantages of reduced cost of administration of the certifying apparatus, increased ease of use for the users, and increased security, as the information unique to the user never leaves the signature server of the certifying apparatus, whether in encrypted form or not. This allows the user to use multiple workstations without carrying their private key to each workstation. Therefore, only a breach of the signature server can result in the private keys being made available outside the signature server, which consequently must be prevented using tamper resistant hardware designed for the purpose, such as the IBM 4758.

In more advanced scenarios, the private key could actually be distributed between any number N of servers using what is )mown as "secret sharing" in such as way that they each have a component of the key by which they can calculate an input for the generation of the signature, which is supplied back to the source device, where the fill digital signature is then calculated from K inputs where K is some number between 2 and N. The advantage of this is that at least K servers would have to be compromised before an attacker could calculate the private key.

The certifying apparatus may include anything which is century based, and accessible from one or more source devices. Preferably, the certifying apparatus comprises a signature server. Preferably, the certifying apparatus also comprises an authentication server. Preferably, the certifying apparatus is accessible from many source devices.

The source device may typically be a workstation, but may also be an interactive television, or an Automated Teller Machine for supplying cash or other information from a central certifying apparatus. The source device will have all software required to communicate effectively with the certifying apparatus, but this could be supplied or downloaded to the source device for the required duration of interaction only. The source device allows communication with the certifying apparatus.

Preferably, the unique element or elements comprise the private key of a public key/private key pair specific to the user. The unique element or elements may generate a digital signature specific to the user, on data supplied by the user. Such PKI keys and digital signatures provide high security for the reasons given above, in that they are very hard and decrypt fraudulently.

The recipient device may be the same as the source device, or, alternatively, it may be a third party device. The latter allows the whole message, or only a derived part, (preferably a hash value) of a message to be certified to be passed on to the required party without necessarily returning the certified message to the source device after certification.

The third party device may be any appropriate device for receiving the certified data, other than the source device, such as a separate workstation, or a network of computers. For example, the third party device could be a gateway for a Local Area Network (LAN). Alternatively, the certifying apparatus and third party device could be within a single LAN, or comprise a Wide Area Network (WAN).

In a further aspect of the invention there is provided a method of certifying electronic data supplied by a user as originating from that user, the method comprising establishing a secure connection between a source device and a certifying apparatus, sending the data from the source device to be received by the certifying apparatus, and receiving a version of the data from the certifying apparatus certified as originating from the user using information unique to the user by cryptographic techniques.

Preferably, the step of incorporating the certified version of the data into further data to be sent to a third patty device is included Preferably, the certifying apparatus holds information unique to the user to carry out the certification.

Preferably, the unique information is the private key of a public key/private key pair specific to the user. Also, preferably, the unique information is a digital signature specific to the user. Preferably, the data to be certified is a hash value of a message. This gives the advantage that the whole message need not be sent to the signature server to be signed, so reducing the network traffic between the source device and signature server.

Preferably, the source device and certifying apparatus establish an authenticated connection between them before and during transfer of the data to be certified. Additionally, the connection may be encrypted. This reduces the possibility that the connection will be intercepted or interfered with.

The source device may supply one or several tokens to the certifying apparatus for authentication. Preferably, one of the tokens is supplied to the user or source device by the certifying apparatus via an alternate channel to the authenticated connection. This also increases security significantly, by requiring two channels to be intercepted to fully access the data.

The alternate channel could be a mobile telephone network channel. It is particularly preferred to use Short Message Service messages to convey the token.

The token may be a fixed password in the most simple solution. In a preferred solution, the token is a one-time password, which has been communicated through an authenticated channel such as a mobile phone, or is calculated dynamically by means of a physical token which shares a key with the certifying apparatus. Such solutions are generally available on the market, and examples are given below.

Preferably, the token is unique to each transaction, a transaction being the process of signing data, supplied by the source device, by the certifying device and supplying the signed data to a recipient device. The token may be stored on a portable device.

Preferably, more than one type of token may authenticate the user or source device. For example, a fixed password may be used in addition to a one-time password generated by a physical token or sent to the user's mobile phone. The independence of these tokens makes it very difficult for an attacker to compromise both simultaneously. Thus such schemes are said to provide 'strong' authentication of the user, and may be employed to achieve a higher level of security than that obtained by use of a single authentication token alone.

A further preferable feature is that the method operates with one level of security reached by authenticating the user regardless of the source device, and another, higher, level of security reached by authenticating the user and the source device. Preferably, the certifying apparatus certifies the data with different unique elements, dependent upon the type of token used to authenticate the user or source device of security as well as the data. Such multiple level authentication allows different levels of security, and trust, to be placed on connections utilising different types of token, and different levels of signature to be used dependent on the token used.

Where more than one type of token is used, perhaps simultaneously, to authenticate the user, it may be desirable to ensure that administration of these tokens is handled by separate independent groups of administrators. To this end, it is possible to configure the certifying apparatus as a group of more than one separate servers, and to have each server manage one or more independent authentication tokens.

One example of this is in the case where the user's private key is distributed using a secret sharing scheme between several servers. An alternative is for the user key to reside in a single server, known as the signature server, and for this to operate in conjunction with one or more other servers associated with user authentication, known as authentication servers.

The user may establish separate connections to each server. It is also possible for the user to authenticate themselves using tokens managed by separate servers without having to establish separate connections to each server. An example of such a scheme is given in the description of an embodiment of the invention below.

Preferably, validation data for validating the user and/or the data to be certified must be received by the certifying apparatus before the data can be certified Preferably, the certifying apparatus sends a request to a remote device to provide the user with identification data Further, the certifying apparatus may receive a version of the identification data (for example a one-time password) from the remote device, and this version may be compared with further user data supplied from the user (for example a derived version of the one-tie password). Then, if the comparison is successful, the data to be certified is certified as originating from the user.

A connection may be established between the workstation of the user and the remote device. This connection may be verified and authenticated independently of the connection between the workstation and the certifying device/signature server.

According to a farther aspect of the invention, there is provided a method for use in certification of data comprising receiving a request from a remote device to supply a user with identification data, supplying said identification data to a user, and supplying a derived version of the identification data to the remote device.

This method provides a fierier channel for sending identification data such as one-time passwords to a user. The method of transferring the identification data may be different to the method used for transferring the request from the remote device, and the method of sending the derived version of the identification data.

According to further aspects of the invention, a computer apparatus is provided as claimed in Claim 43 or 45. According to further aspects of the invention, a carrier medium is provided as claimed in Claim 44 or 46.

According to a filer aspect of the present invention, there is provided a data certifying apparatus, comprising a signing device adapted to certify data received from a remote source device as originating from a user, wherein the certifying apparatus is arranged to receive data from the source device, certify the data as belonging to the user, using information stored in the certifying apparatus, said information being unique to the user, and send the certified data to a recipient device.

Preferably, the recipient device is the source device. Alternatively, the recipient device may be a third party device.

Preferably, the source device and certifying apparatus are arranged to establish an authenticated connection between them before and during transfer of the data to be certified. A further preferable feature is that the connection is encrypted.

The source device may be arranged to supply a token to the certifying apparatus for authentication. Preferably, this token is supplied to the user or source by the authentication device via an alternate channel to the authenticated connection. The token may be a fixed password Alternatively, the password may be a one time password. Again, the token may be unique to the transaction.

Preferably, in the apparatus of the present invention more than one type of token may authenticate the user and the source device.

As a further preferable feature, the data certifying apparatus may be arranged to operate with one level of security reached by authenticating the user regardless of the source device, and another, higher, level of security reached by authenticating the user and the source device, if one particular source device, e.g. a trusted work station is used. Additionally, the certifying apparatus may be arranged to certify the data with different unique elements, dependent upon the type of token used to authenticate the user or source device of security as well as the data.

The certifying apparatus may also comprise instructing means for sending a request to a remote device to instruct the remote device to send identification data (for example a one-time password) to the user. The certifying apparatus may also comprise receiving means for receiving data derived from the identification data from the remote device.

The derived data from the remote device may be compared with comparison means to further data received by the receiving means, and certifying means which certify the data to be certified if the data compared at the comparison means match.

According to a further aspect of the invention, there is provided an apparatus for use in data certification, comprising receiving means for receiving a request from a remote device to supply a user with identification data supplying means for supplying said identification data to a user and further supplying means for supplying a derived version of the identification data to the remote device.

Preferably, password generating means are also provided, which generate a password, for example a one-time password, although other identification data may also be generated Preferably, the receiving means and further supplying means are arranged to operate via a different communication method to the supplying means.

The embodiments and aspects of the invention described above are not only to be interpreted individually nor solely in combination, but may be combined in any way in order to provide further embodiments of the invention. Additionally, individual features from an embodiment may be combined with other features from another embodiment so that various combinations of individual features from different embodiments and aspects also provide further embodiments of the invention.

Specific embodiments of the present invention will now be described, purely by way of example, with reference to the drawings, in which.

Figure 1:
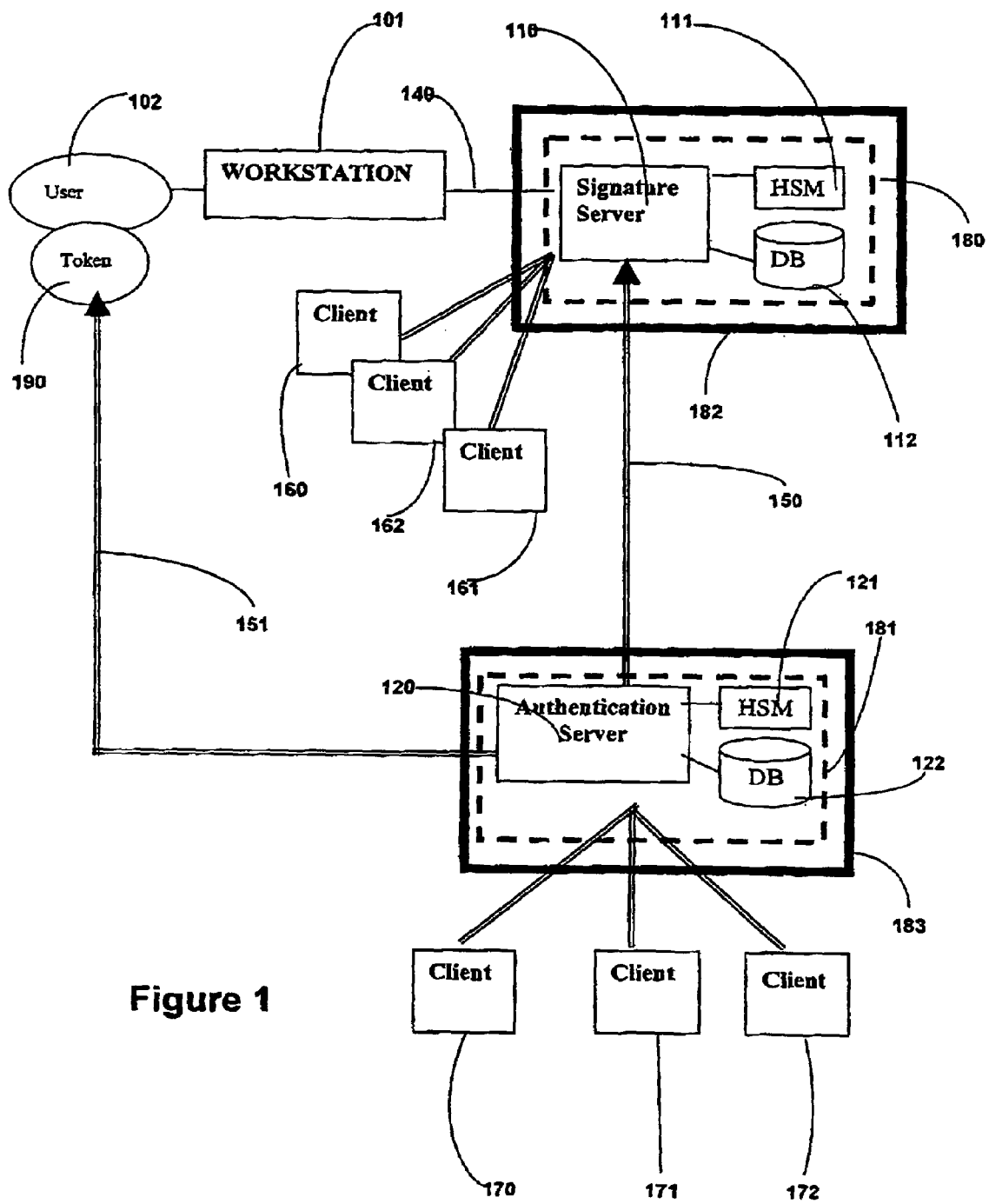
FIG. 1 shows the architecture of the connections between various components according to a first embodiment of the present invention.

FIG. 1 schematically shows a system according to an embodiment of the present invention. It shows a user 102 operating a source device, which in the present embodiment is a workstation 101, which is connected to a certifying device, which in the present embodiment is signature server 110, via a communication line 140. The communication line 140 is not inherently secure. The workstation 101 may be any terminal at which communication may be established with the signature server 110. For example, the workstation 101 may be an interactive television set. The requirement is that the workstation 101 can communicate with the signature server 110. No special software is required at the workstation 101 side of the link. The signature server 110 securely stores the private keys of each user and may additionally log some or all relevant information regarding users and their activities. The signature server 110 handles requests from users via the workstation 101 and may issue requests to a CA server. The signature server 110 is ideally certified to an International standard, such as FIPS 140-1 level 3 or 4 (see FIPS Pub 140-1, 1994. National Institute of Standards & Technology, USA, the contents of which are incorporated herein by reference), which is a generally accepted standard to indicate the quality of the tamper resistance features of the hardware protection of the server.

The signature server 110 receives data, which is to be verified as originating from the user, from the workstation 101. Verification is achieved using the private key of the user, which is stored on the signature server 110, to encrypt data received from the workstation 101 and return that data to a recipient, which may be the user or a third party. Processes according to embodiments of the present invention will be described in more detail with reference to FIGS. 3, 4 and 5 below.

The details of the hardware used in this embodiment of the invention will now be described. In addition to the signature server 110, in an embodiment of the present embodiment the certification apparatus also has a separate authentication server 120, which is enhanced by tamper resistant hardware just as the signature server 110. Alternatively, the authentication server 120 may be remote to the signature server 110. The signature server 110 is connected to the authentication server 120 via a strong cryptographic link 150 (i.e. encrypted and authenticated), for example by a shared master key, or based on public key encryption-decryption, using standard solutions, also sometimes known as a VPN (virtual private network). This is used to establish a session key and secure an encrypted channel between the servers using standard cryptographic techniques as is well known in the art. The key used might depend on the user password used for access. The secure tunnel 150 from authentication server 120 to signature server 110 continues into the hardware part of the signature server 110, in the sense that the keys used for this tunnel are controlled by tamper resistant hardware and never appear in the clear outside the certifying apparatus. The integrity of the system does not then have to rely so much on the secure area in which the server is placed. The same applies for all communication to and from both the signature server 110 and authentication server 120.

The authentication server 120 distributes one-time passwords and/or challenges to customers through an alternate channel 151. In the present embodiment, the alternate channel 151 employs SMS (short message service) messages sent via a cellular network for mobile phones for communicating the one-time passwords. Alternatively, the user might possess a handheld so-called secure token 190, a small device which shares an individual key with the authentication server 120. Once the challenge has been received via the workstation 101, this is keyed in by the user on the token 190, and the response which basically is an encryption of the challenge with the key held on the token 190, is keyed in at the workstation 101 as the one-time password. The signature server 110 may verify that the response is indeed an encryption of the challenge as it receives a derived version of the one time password from the authentication server 120. However, many alternatives are available such as Wireless Application Protocol (WAP) over a cellular network (which is a specialised version of the Internet, and which can be accessed by WAP enabled mobile telephones), or ordinary paper mail. Alternatively, passwords may be distributed via the Internet, via an applet, which communicates as directly as possible with a printer attached to the workstation 101 (as this limits the risk of password copies remaining in their printer/spooler buffers, or on the workstation 101 by means of Trojan horses which "sniff" the passwords). Examples of types of password that can be used in the present invention are discussed below in any event, the exact nature of this authentication process is not limited to that described, and many variations are possible within the context of the invention.

At registration, a fixed password is forwarded in a secure way to the user 102—which at any point in time he may change—so that each user 102 may be authenticated in a connection between a workstation 101 and signature server 110 as part of the user authentication process. In the present embodiment, in addition an on-line, one-time password is distributed via an SMS message from the authentication server 120 to the user's mobile phone (not shown). Such an on-line one-time password can have an extremely short validity period, which, together with the authentication implied by the fact that the server knows how to locate the customer, gives high security to the password. The mobile telephone number of the user uniquely determines the user so the mobile telephone must be stolen, borrowed or cloned for identification to fail, unless the SMS message is intercepted by someone who can at the same time make use of this information, which is relatively hard as the authentication channel is independent of the communication channel.

This embodiment allows the user 102 to make use of their digital signature, while ensuring that the digital signature itself never leaves the secure central certifying apparatus, whether encrypted, or not.

The distribution of password-tokens according to an embodiment of the present invention will now be described using the elements shown in FIG. 1. First, the user 102 contacts the signature server 110 from the workstation 101 via channel 152. The signature server 110, via the secure link 150 established between signature server 110 and authentication server 120, then instructs the authentication server 120 to send out a one-time password to the user 102. The authentication server 120 does this using SMS messaging, as described above, on channel 151. The authentication server 120 also provides the signature server 110 with a derived version of the one-time password, via channel 150. This derived version is, in this embodiment, a hash value of the one-time password. The hash value is derived using a standard one way algorithm, such as SHA-1 (see Secure Hash Standard; FIPS Pub 180-1, 1995, National Institute of Standards & Technology, USA, the contents of which are incorporated herein by reference). A hash value is typically much smaller than the message from which it is so derived and, once the hash is calculated, the original message cannot be found from it. It is also very unlikely that two messages would have the same hash value. This hash of the one-time password is then compared with the hash supplied by the workstation 101. Since the same standard hashing algorithm is used by both the authentication server 120 and the workstation 101, if the two hashes match then the user is accepted as being authenticated by the signature server 110. Alternatively, another type of derived version of the password can be sent to the signature server 110. The requirement is only that the process used to derive the version of the password or token-response is the same in the authentication server 120 and workstation 101 so that a password will give the same derived version as authentication server 120 and workstation 101 but two different passwords will not give the same result.

The comparison of hash values allows the user to be verified while the signature server 110 never receives the actual one-time password.

A variation to the distribution of password tokens described above will now be described. The user establishes independent connections to both the signature server 110 and the authentication server 120, rather than only to the signature server 110. In this instance the data to be certified is sent to the authentication server 120 through one interface and a hash value of the data to the signature server 110 through another interface. Alternatively, the hash value could be replaced by, or added to with, other related data. Typically, the data to be certified is generated at the source device on the basis of third party applications (e.g. a bank) through e.g. an applet or applets, which then forwards the data and a hash on the data to the authentication server 120 and signature server 110 respectively. Each connection may be authenticated by use of a separate token, e.g. a fixed password for the signature server connection and a one-time password for the authentication server connection. The authentication server 120 forwards the data to be certified to the signature server 110, which may compute a hash of the data and compare this with the hash received directly from the user 102. This scheme also provides strong assurance at the signature server 110 that the user 102 has been authenticated by the authentication server 120, but has the advantage that no information relating authentication server user authentication is received by or available to the signature server 110.

Figure 2:
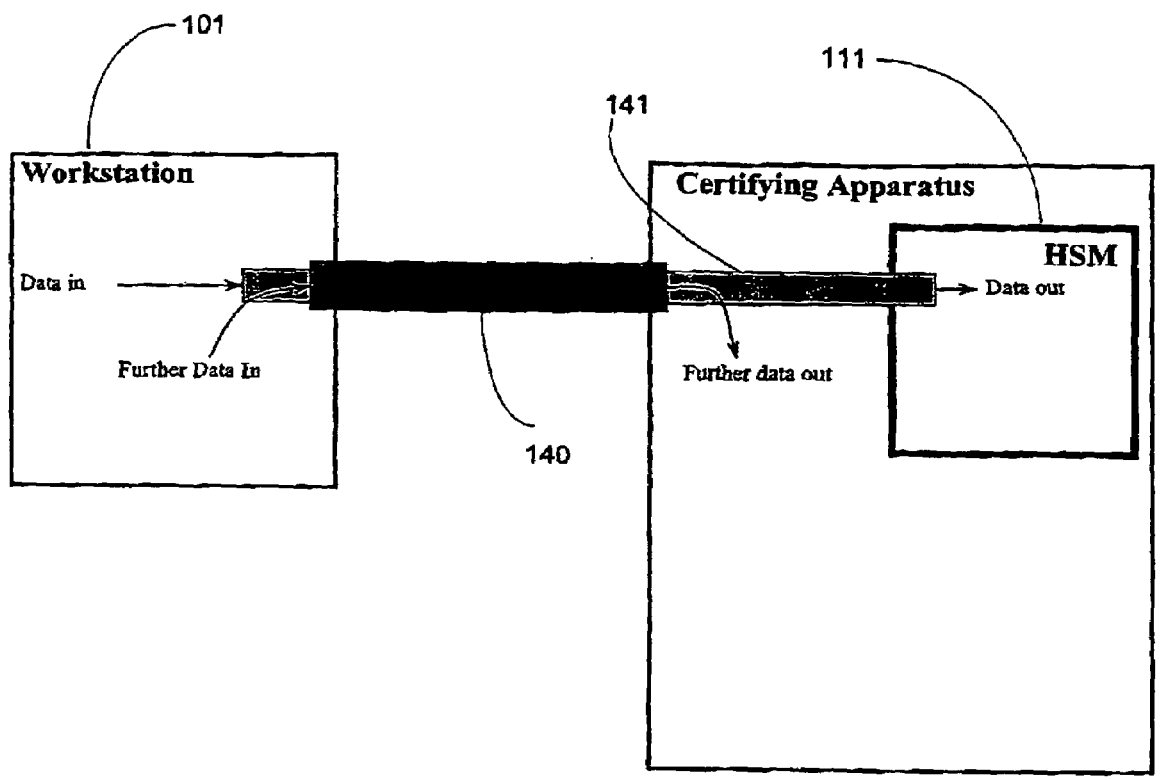
FIG. 2 shows the steps involved in granting a user exclusive access to their signature key according to the first embodiment of the invention.

The signature server 110 is supported by a tamper-resistant hardware security module (HSM) which has a protected cryptographic facility such as the IBM 4758, where keys and signatures are generated, and if keys are not in use then they are stored externally, encrypted under a master key. As shown in FIG. 2, in an embodiment of the invention, initial data provided by the workstation 101 to the certifying appends is transferred to the HSM 111 via a channel 141 set up using the password of the user 102 and standard encryption techniques. A second layer of encryption 140 extends from the workstation to the certifying apparatus, but does not extend into the HSM 111. This is a strong encrypted link with the authentication of the server, and this channel carries further information regarding details of the user 102 and specifying the authentication method to be used for the alternate channel 151. The main point is that no sensitive key ever appears in the clear outside the secure box. Such solutions are widely used by e.g. the banking environment, e.g. in connection with pincode-protection. The database 112 records all information regarding administrators. The HSM 111 handles storage of keys and cryptographic functionality. The signature server 110 is protected both by a firewall 180 and by physical security 182 to prevent, reduce or deter unauthorised access.

In an embodiment of the invention, the signature server 110 is supported by clients 160, 161, 162 operated by trusted personnel e.g. under dual control, connected by an authenticated and encrypted link to the signature server 110. During a session between signature server 110 and client, the administrator will first log on, and at this stage session keys to authenticate and encrypt all communication between the client 160, 161, 162 and the signature server 110 is agreed using the master key, again using standard procedures for setting up a VPN between the client 160, 161, 162 and the server. The necessary transport keys (master keys for exchange of session keys) are stored on smartcards, are operated by administrators and are used to administer (i.e. create/enable/disable) security officer and clerk accounts for the signature server 110, to browse the data in the signature server's 110 database and to register customers (those who have a signature on the server) on the signature server 110.

In highly secure transactions, an embodiment of the invention offers further enhancement, to thwart attacks launched through the graphical user interface to achieve what is known as WYSIWYS (What You See Is What You Sign)); One simple possibility is to let the certifying apparatus confirm essential parts of the data supplied by the user for certification via the second channel used for authentication purpose before the certification is carried out. In this instance the whole message to be certified has to be forwarded to the certifying apparatus for inspection.

The security of officers and the clerks are two levels of administrator of the signature server 110: the security officer is responsible for all security related aspects of operating the signature server 110, including adding new administrators, exporting the audit log, and suspending or disabling administrator accounts. The clerk is responsible for user related activities such as registering new customers with the system, suspending/disabling customers, extracting reports about the customer activities and the like. The two levels give increased security to the system by restricting access to some systems more than others.

While two levels of signature server 110 administrators have been given, it is possible to divide authorised activities between any number of different structures as required. For example, it is possible to allow the customer to perform simple administrative tasks such as issuing new passwords, requesting reports on their activity or suspending his own account if fraudulent use is suspected. However, in the present embodiment accounts can only be reenabled by a clerk and will result in a new password being sent from the authentication server 120 to the customer via the user's mobile telephone.

The authentication server 120 is also enhanced by a hardware security module 121, and has a database 122, in the same way as the signature server 110 and protected by a firewall 181 and physical security 183. The authentication server 120 is also connected with clients 170, 171, 172 using authenticated encrypted channels as described above in relation to the signature server 110 client links. For security, these clients 170, 171, 172 are separate to the clients 160, 161, 162 administering the signature server 110.

The signature server 110 and authentication server 120 is preferably housed geographically separated and are each operated by an independent body with separate clients 160, 161, 162 and 170, 171, 172 administering each. This reduces the possibility that there will be unauthorised access to both servers, which would be required if the private key of the user were to be misused.

Alternatively, the authentication server 120 and signature server 110 may be housed in the same certifying apparatus. In such a case the administration clients 160, 161, 162, and 170, 171, 172 for each server (e.g. the interface through which the server is operated) should preferably remain separate, so that increased security is provided, by ensuring that access to both servers cannot be obtained through the same client, although they could be the same. The advantage of this single-sever approach is that this approach is simpler, as only one server is operated rather than two, but the disadvantage is that more care is required to assure that the trusted personnel cannot thwart the system in any way.

As well as the on-line one-time password given so far in the present embodiment, a number of other types of password and delivery methods may be employed in addition to SMS messages distributing on-line one-time passwords. Authentication may be achieved by means of tokens 190 e.g. passwords, one-time passwords, stored secrets etc. The different types of token have different properties regarding their mobility and security. For all types of password a key is generated for authenticating the request at the signature server 110. The signature server 110 will generate the key in a similar way and verify the request.

Fixed passwords are passwords which do not change, and can be used many times on different occasions to authenticate a user. Such fixed passwords are mobile, but less secure than one-time passwords because they are easily eavesdropped, either by physically observing the customer when the password is entered, or by fooling the customer into entering the password in a false password prompt. It is not possible to determine whether a fixed password is compromised or not, but in case of suspected compromise (e.g. based on audit trails), the password can be disabled.

Fixed passwords must originally be provided by the authentication server 120, to the user, via a secure channel (e.g. in a sealed envelope) because initially the user has no way of authenticating himself on the network. After the initial password has been received, the user may change the password online if sufficient authentication and confidentiality is provided.

Fixed passwords may be categorised by how susceptible they are for being compromised, such that one may have one password for controlled or secure environments and another for less controlled or secure environments.

Alternatively, stored one-time passwords may be employed, which are mobile and safer than fixed passwords, but may be compromised by physical theft or by copying. Theft is easily detected whether the passwords are stored on print or in a mobile device. However, copying is not detectable.

Stored one-time passwords have a long validity period and must be transmitted securely from the authentication server 120 to the user. The copying of one time passwords must be prevented and this may be very hard to do if passwords are transmitted on-line over the Internet because they may reside in various cache files, printer buffers etc., for a long time after the user believes them to be erased. Cryptographically secured communication reduces the problem of obtaining the passwords during transmission to the user, but does not guarantee anything about plain text copies stored at the workstation.

The on-line one-time passwords of the present embodiment are more secure than stored one-time passwords due to the short validity period making theft and subsequent use virtually impossible. However, interception of the alternate channel is still possible, although it is highly unlikely that both channels may be attacked by the same attacker at the same time, which is a strength of the approach.

A further alternative is a terminal fingerprint, which may be used to identify a particular user's workstation 101. It is a value that uniquely identifies the workstation 101. Such a fingerprint can be computed based on secrets stored on the workstation 101, the hardware configuration of the workstation 101 and all serial numbers of hardware devices in the workstation 101. However, as a fingerprint can be forged by copying all this information, fingerprints are only relevant for terminals in controlled environments i.e. those having physical and software protection. Terminal fingerprints are not suitable tokens in a situation where the customer uses many different terminals, but rather for the situation where trustworthy identification is required for a single terminal. Stealing a fingerprint requires a break-in or a hacker attack, but cannot be considered detectable.

It would improve the security, if there is one secure trusted workstation 101 available to the user with a secure tunnel connection to the signature server 110 as well as the authentication server 120, in that this would enable the user e.g. to change his memorised password in a secure manner at any point in time from this particular work station.

In a further alternative, a high level of security occurs when sessions with the signature server 110 are chained. This means that the server returns a token 190, which is stored on the workstation 101 and returned to the server on instigation of the next session. The token 190 returned may or may not be distributed and kept securely but will always allow the customer to detect abuse of his signature, since the next session will fail authentication because the token will have been returned to the fraudulent user, rather than the legitimate one. This solution requires careful synchronisation between customer and server in order to ensure that tokens are not lost in case connections fail. There are many known and well understood methods for dealing with this.

A further, more secure token 190 is a cryptographic add-on for a computer, which allows complete identification of a workstation 101 by the use of a challenge-response protocol. Although such add-ons may be physically small and flexible, they are not suited to use with multiple workstations 101 as their complete identification of a single workstation 101 is required An example of this would be a small unit ("dongle") connected to the serial port of the workstation 101, such as devices available on the market for software and or information protection.

Handheld devices such as password generators and smart card front ends allow very trustworthy identification of the device in question, even though the device may be stolen just as any other device. Compared with terminal one-time passwords via SMS to another telephone, the advantage of a handheld cryptographic device is that the SMS message may be eavesdropped or intercepted, whereas the cryptographic device may not be meaningfully so.

The most secure means of identification may be the use of a physical attribute of the user such as a retinal or fingerprint scan. However, at the present time, such scanners are not widely available on any workstation 101 through which a session may wish to be conducted.

As communication with mobile units becomes more advanced, it will be possible to adapt more and more advanced authentication channels, and these could equally be used, as long as they fulfil the requirements of user authorisation and/or authentication.

Obviously, various schemes discussed above will have various levels of security. The lowest level (level 1) is where the user just memorises a password he shares with the signature server, which he includes whenever a signature must be generated.

More advanced is the solution (level 2) where in addition he includes a one-time password which he has received previously via an independent authorised channel from the authentication server, e.g. an SMS message, a paper based list by ordinary mail, or communicated to a secure work station through an encrypted tunnel and then printed out. At every new transaction, a new password is used in addition to a unique password memorised by the user.

Even more advanced and flexible (level 3) is the situation where the user possesses a handheld token, such as a VASCO Digipass, or the RSA SecureID Key Fob, which shares e.g. conventional key with the signature server. When the user logs on, he either receives a so-called challenge from the certification device which he keys in on the token. The token then processes the challenge and returns a so-called response on its display, which is keyed in on the work station by the user as the one time password, and verified to be correct by the certification device. Other tokens, generally available on the market as well, automatically calculate a new response at regular intervals using a key shared with the certification device, which may be varied without the use of a challenge, as the challenge is implicit to the system.

For level 3, any sufficiently secure personal identification scheme based on tokens available on the market may in principle be incorporated into the invention in order to create the necessary authentication of the user. This token may also be a mobile device, which may communicate securely with the certification device e.g. using WAP-security for the receipt of one-time passwords from the authentication server, or whichever communication security is available for that device, such as Bluetooth or infrared carried communication to some terminal connected to the authentication server trough a physical network. Again the physical network need not be secure, as the communication is secured by means of a secure tunnel between the authentication server and the mobile device.

A further level of security, for example for a fixed permanent trusted workstation 101 may be reached if a hardware cryptographic device is used to provide complete identification of the workstation 101. For this level the workstation 101 could be bound to an IP-address or to a telephone number.

Of course, many levels of access and security can be introduced as required with different properties and requirements. Advantages of the above embodiments are that the signature server 110 is used in such a way that the private key of a user is never transmitted outside of the secure signature server 110, whether or not encrypted. This means that substantially increased security is available protecting the private keys of users.

Because it is possible to operate with different trust levels, depending on the authentication token 190 or tokens supplied to the signature server 110, poorly identified sessions (i.e. those authenticated according to level 2) may be used for only signatures for transactions with small potential losses as a result of fraud (e.g. small bank transactions) whereas a more secure session (i.e. those authenticated according to level 3 or 4) such as the user's home PC, may be used for transactions with larger potential losses as a result of fraud, the embodiments of the present invention allow the combination of use of a secure fixed terminal system together with the mobility given by being able to use any workstation 101. Therefore the advantages of each are given.

When a customer wishes to be registered at the signature server 110, he or she contacts a clerk, who takes care of the registration. If the customer wishes to be registered with a certificate, two options exist depending on whether the CA and the signature server 110 are operated by the same organisation or not.

1. If both servers are operated by the same organization, the client can be registered at the CA and at the signature server 110 simultaneously, and a key pair and a certificate can be generated immediately.

2. If the servers are operated by different organisations, the customer first needs to be registered at the CA and perhaps receive a sender key ID and an IAK (Initial Authentication Key) then the customer can just be registered at the signature server 110. If the customer is willing to reveal the sender ID and the IAK to the clerk, the key pair can be generated immediately as in case 1, otherwise the key generation must be initiated via the internet.

The registration procedure can be achieved using well known and understood methods, such as the International Standard PKIX, and would typically be the responsibility of the chosen CA. Certificates would only be required when the certifying apparatus is receiving data to be certified from many source devices. If the source device is known then no external CA would be required.

Figure 3:
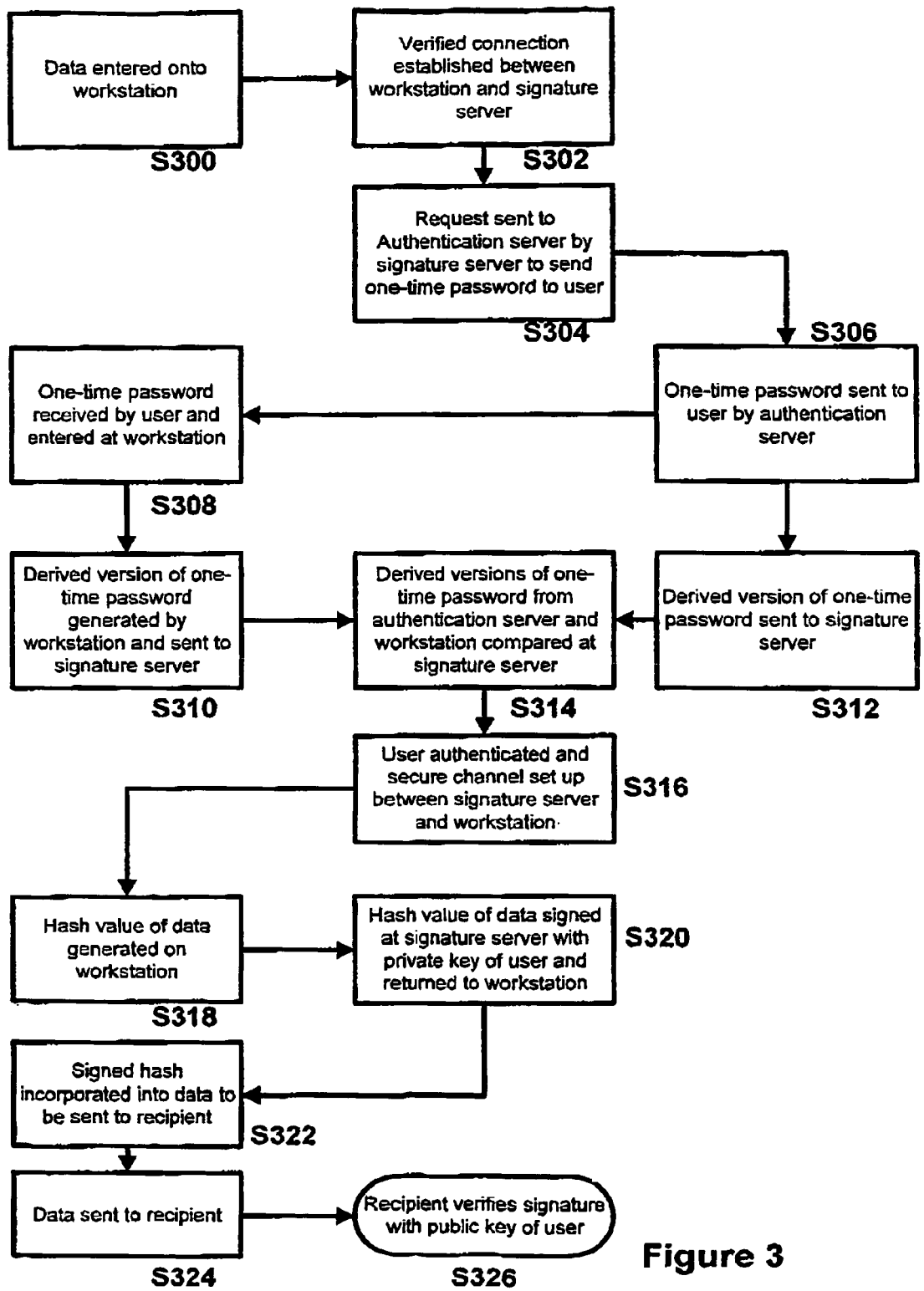
FIG. 3 shows a flow diagram of a method according to a first embodiment of the invention.

FIG. 3 shows a flow diagram of the steps involved when a message is signed with the user's private key held on the signature server 110.

At S300 the message is entered onto a workstation 101. The message may be manually entered at the workstation 101. Alternatively, the message may be written at an earlier stage and stored elsewhere before being loaded onto the workstation 101. When the message is ready to be sent, in this embodiment the workstation 101 is connected to the Internet. However, direct (point to point) connection between workstation and signature server 110 may alternatively be used. The Internet is used to contact the signature server 110 over an insecure channel. At this stage, the signature server 110 and workstation 101 do not know to whom they are respectively connected. In order to determine this, verification of the communications is required at S302. Verification of the signature server 110 can be accomplished by the use of a public key/private key pair. The signature server's 110 public key is published and available to the workstation 101, for instance, from a CA. Various methods of establishing the identity of the server are then available that all involve the use of the server's private key to encrypt or decrypt a message. Since the private key of the signature server 110 is known only to the signature server 110, the workstation 101 is able to identify messages as coming from the signature server 110. Also, using the signature server's 110 private key/public key pair, a secure tunnel is able to be set up from the workstation 101 to the signature server 110 by the workstation 101 encoding with the server's public key and only the server being able to decrypt it with its private key. A wide variety of authentication and encryption processes, which are well known in the art, can be employed in the invention. In the present embodiment, the user is identified by use of a fixed password which is recognised by the signature server during the authentication process.

However, at this stage, the signature server 110 has not authenticated the workstation 101 as being used by a particular user of the certification system. The signature server 110 needs to receive some secret from the workstation 101 which is only known by the user in order to carry out authentication. This is done by the signature server 110 requesting that the authentication server 120 send an on-line onetime password to the user over a separate channel to the link between the signature server 110 and the workstation 110 at S304. In this embodiment, this is done by an SMS message. The user subsequently enters it into the workstation 101 at S308, once it has been received. Because the connection from workstation 101 to signature server 110 is secure in the direction from workstation 101 to signature server 110, eavesdropping will not identify the password entered and sent to the signature server 110. In addition, as stated above, the workstation 101 derives a hash value from the password, rather than sending the password over the connection at S310. The authentication server 120 sends its own version of the derived result to the signature server 110 at S312, and the signature server 110 compares both values. If they are the same then it is very unlikely that an incorrect password was entered and the password is verified at S314.

Once the password has been verified, a bi-directional secure channel is established at S316. This can be set up by using the secret (i.e. the password), which is sent to the signature server 110 with the signature server's 110 public key to generate a session key. This secure channel is based on the usual principles of a VPN.

Alternatively, one of the other forms of password or token 190 discussed above may be used to authenticate the user depending on whether the user is at a secure workstation 101 or a non secure workstation 101.

As mentioned, the invention is not limited to any specific algorithms and methods to set up the security channel. The requirement is simply that a secure channel is established In the case of the current embodiment, the secure channel is bi directional, However, this need not be the case in general.

Once the bi-directional secure channel has been established, the workstation 101 calculates a hash value of the message which the user wishes to be certified at S318. This hash value is then sent over the secure channel, to the signature server 110. Once the signature server 110 receives the hash value, it retrieves the private key of the user from the HSM and encodes the hash value with the user's private key at S320 (of course, the user's private key may be retrieved at any time after the user's identity is established).

The signed hash is then returned to the workstation 101. This hash has now been encrypted using the private key of the user and so is certified as originating from that user. This has been achieved without the private key ever leaving a physically and software protected environment of the signature server 110. Therefore, this embodiment of the invention overcomes the security disadvantages by ensuring that the private key is never available outside the signature server 110. This increase in security of the private key results in an increased value of the certificate, as the message is more likely to be authentic.

The signed hash value is then embedded in the full original message at S322 and can then be sent over an insecure channel, such as the Internet, to a recipient S324. The message is certified as being from the owner of the digital signature.

Additionally, because in an embodiment of the invention the signature server 110 and the authentication server 120 are both used, and are preferably separated geographically, and because all tree of workstation 101, signature server 110 and authentication server 120 must be involved in the certifying of the data from the workstation 101, both the signature server and authentication server must be compromised in order to falsify a certification. The likelihood of this is reduced by the separation of the servers, and by independent administration of each server.

An insecure channel may be used to distribute the signed message, since the signed hash value acts both as an identifier and an authenticator of the message content. At S326 in FIG. 3, the recipient checks with the certification authority used to issue the user's public key/private key pair, and receives the user's public key. This is used to decrypt the hash value of the message and so certify that the originator of the message is the user. In addition, the recipient can calculate the hash value of the message itself and check that this hash value matches the encrypted hash value. If this is not the case, then the message has been tampered with and can be discarded.

If the message is sent over an insecure channel, while it will not be possible to tamper with the message without detection, it still may be possible to intercept and read the message before it is received by the recipient. In order to avoid this, a secure channel between user and recipient can be established using a method as described above, or any other suitable method. The secure channel need only be from the user to the recipients. The recipients need not establish a secure channel for information passing back to the user, unless sensitive or secret information is to be returned to the user from the recipient.

Figure 4:
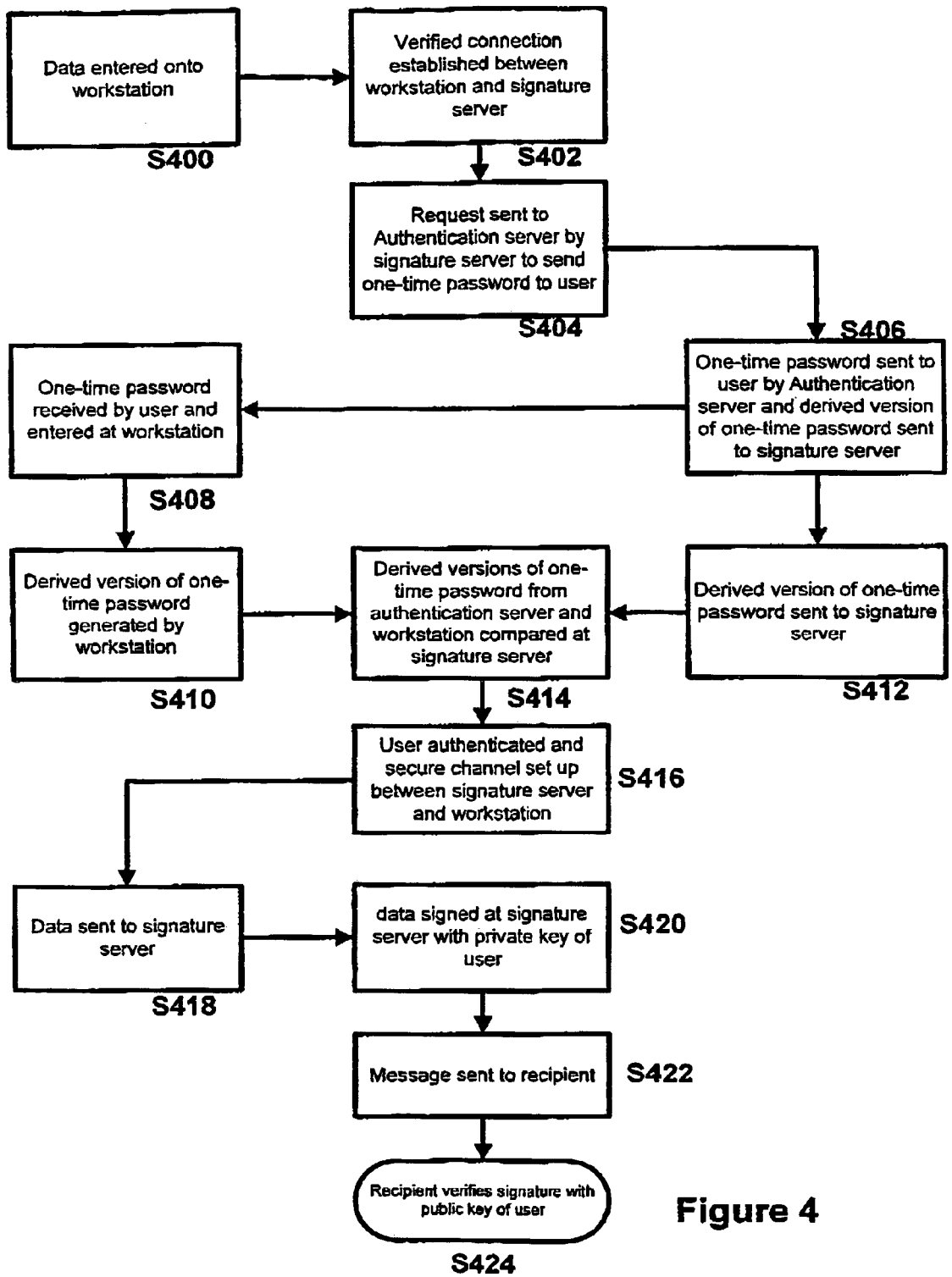
FIG. 4 shows a flow diagram of a method according to a further embodiment of the invention.

Alternatively, in order to avoid the problem of third parties intercepting and reading the message between user and recipient, a method as shown in FIG. 4 may be employed.

This method is similar to that shown in FIG. 3. In S400 the message is entered into the workstation 101. S402 to S416 are as described above with reference to FIG. 3, to establish a secure channel between workstation 101 and signature server 110. However, only a one-way secure channel need be established because, in this embodiment, the steps following establishment of a secure channel are different to the embodiment shown in FIG. 3. This embodiment differs in that the whole message is sent from the workstation 101 to the signature server 10 at S418.

Therefore, no information requiring encryption need be returned to the workstation 101 from the signature server 110. However, in practice, a bi-directional secure channel is preferably set up, to avoid misinformation from third parties regarding the signature server 110, and its status, being sent to the workstation 101.

In this embodiment, the signature server 110 uses the user's private key to encrypt the entire message as sent by the user. In addition, the user also supplies delivery details for the message to a recipient. At this stage, other than a notice of receipt of the message, the signature server 110 need not reply to the workstation 101.

Once the message has been encrypted with the user's private key, the signature server 110 also adds the signature server's 110 signature, by encrypting with the signature server's 110 private key, and forwards this encrypted message to the new recipient directly. The recipients can verify the message in the same way as discussed with relation to FIG. 3, except that the signature server's 110 public key is used, as well as the user's public key. Again, standard methods for encryption and signing are used here.

Some, or all signature requests can have a summary field which is logged in the audit log. The purpose of the summary is to make it possible to extract meaningful reports over the customers' activities and allow tracing, if a transaction is questioned.

In addition, multiple request transactions may be supported wherein the user supplies multiple requests for multiple signals where each request must be separately authenticated. This allows the customer to prepare a number of requests and have them all executed with a single log-on. If necessary, special network applications may cache passwords in order to provide a more user-friendly interface.

The user can also request that a message or message hash is tie-stamped and have a limited life-spar. This is done using a flag in the signature request which determines whether a time-stamp should be supplied or not. Time stamping could, for example, be supported by contacting a time stamp server via the PKIX TSP protocol, where a received signature on some message, or the concatenation of a number of signatures is sent to an independent third party offering independent timestamping. A timestamp is then added, and a signature is generated on the message consisting of the received signatures and the timestamp.

An alternative method to that described with reference to FIGS. 3 and 4 above will be described with reference to FIG. 5.

The system and method is especially useful where the signature and authentication servers 110, 120 are geographically separated and administered by independent bodies. All other features may be as either described with reference to FIGS. 3 and 4.

The data to be signed is entered on the workstation at S500. An application or other program downloaded from a third party to the workstation 101. In this embodiment, the workstation runs the applet or program, which connects to both the signature server 110 and authentication server 120. The signature server 110 requests and receives the fixed password from the user 102 (as described in regard to registration above) at S502. An authorised connection with the signature server 110 is then established at S504 as described before with reference to S302 described above.

The signature server 110 then requests the authorisation server 120 to send a one-time password to the user via a different channel at S506 as in S304 described above.

The one-time password is seat to the user at S508 who enters it across the connection established between workstation 101 and authorisation server 120 at S510. A verified connection is therefore set up between both workstation 101 and signature server 110, and workstation 101 and authentication server 120 at S512.

The data to be certified is sent to the authentication server 120 through one connection at S514, and a derived value (in this embodiment a hash value of the data, as described above) of the data to be certified is sent to the signature server 110 at S516.

The authentication server 120 sends the data to be certified to the signature server, which computes the hash of the data to produce a derived value for comparison with the derived value sent direct from the workstation.

The two derived values are then compared by the signature server 110 at S518, which ensures that the two servers are connected to the same user.

The signature server 110 can then sign the data received from the authentication server 120 and return it to the workstation 101, or forward to a third party recipient.

It is also possible that the derived version of the data be sent to the authentication server 120 and the actual data sent to the signature server 110. However, this is not preferred as the signature server 110 is then in possession of the data to be signed before the authentication server 120 authenticates it and the system could therefore be abused if illegitimate control of the signature server 110 was obtained.

Figure 5:
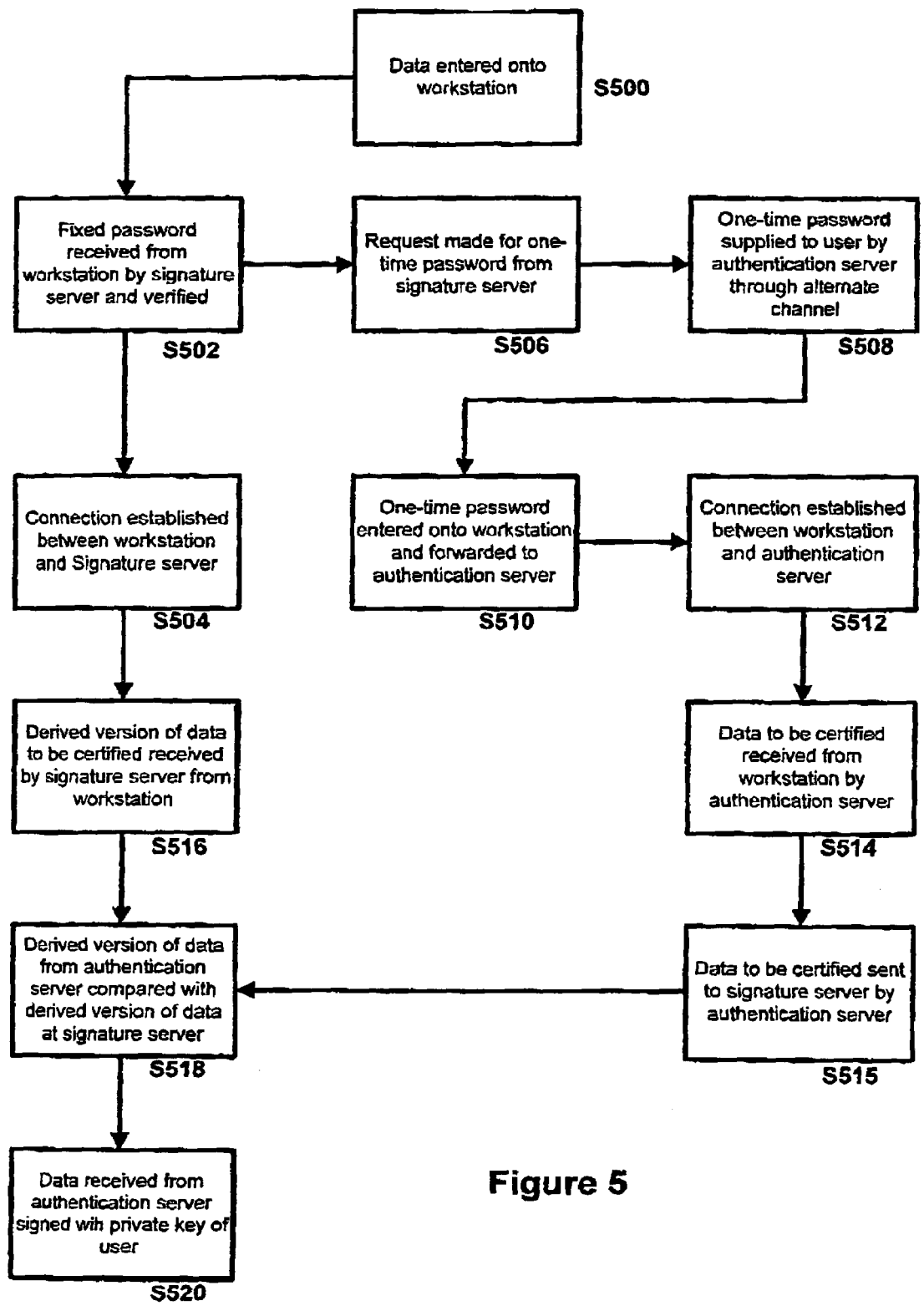
FIG. 5 shows a flow diagram according to a further embodiment of the present invention.

As well as using the one-time password issued by the authentication server 120 to authenticate the connection between the workstation 101 and signature server 110, as described above, it is also possible to use a token to validate the connection between workstation 101 and signature server 110, in the case of FIG. 4, and separate tokens to validate the connections between the workstation 101 and each server in the case of FIG. 5. In this alternative validation procedure, the two channels are established completely independently, which is especially useful where the signature and authentication servers 110, 120 are separated geographically and administrated separately.

The embodiments provide a certification method which meets the requirements for adequate protection of the private key e.g. to meet the requirements in the Directive of the European Union on qualified certificates; allows the genuine owner to initiate the generation of a digital signature from any appropriate workstation 101 connected to some appropriate network, such as the Internet, without ever compromising the signature key, yet at the same time prevents anyone with total control over a workstation 101 which has been used as described above to subsequently have a new signature generated by means of the key of that owner.

Although the above embodiments have been described in relation to a workstation and server, any situation where a message needs to be signed with a digital signature without the private key of a user leaving a secure server will also fall within this invention. Also, the terms server, client and workstation used herein are not limited to the narrow meaning of the terms. A server may be any computer or the like, which can be contacted as a central unit by a number of workstations. A workstation is in interface between the user and the server, which transmits the electronic data and passwords, if required, to the server. Clients are simply interfaces, which allow administration of a server.

The present invention has been described above purely by way of example, and modifications can be made within the spirit of the invention. The invention also consists in any individual features described or implicit herein or shown or implicit in the drawings or any combination of any such features or any generalisation of any such features or combination, which extends to equivalents thereof.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

The invention claimed is:

1. A method of certifying electronic data supplied by a user, the method comprising:
   receiving data supplied by the user to be certified at a certifying apparatus from a source device;
   sending a request to a remote device instructing the remote device to send a password to the user wherein
   the password is sent from the remote device direct to the user without the password being received at the certifying apparatus;
   receiving, at the certifying apparatus direct from the remote device, a hash value derived from the password;
   receiving, at the certifying apparatus direct from the user, a further hash value derived from the password;
   comparing, at the certifying apparatus without receiving said password, the further hash value from the user with the hash value from the remote device;
   validating the user if the further hash value from the user matches the hash value from the remote device;
   certifying the data at the certifying apparatus with one or more elements of information secure to the certifying apparatus, said elements being unique to the user if the further hash value matches the hash value derived from the remote device; and
   outputting the data so certified from the certifying apparatus, for passing to a recipient device;
   wherein the elements of secure information certify that the supplier of the data is the user.

2. A method according to claim 1, wherein the private key of a public key/private key pair specific to the user defines a said element unique to the user.

3. A method according to claim 1 or 2, wherein a digital signature specific to the user defines a said element unique to the user.

4. A method according to claim 1 or 2, wherein the recipient device is the source device.

5. A method according to claim 1 or 2, wherein the recipient device is a third party device.

6. A method according to claim 1 or 2, wherein a hash value of a message to be certified is generated at the source device, the hash value being the data to be certified by the certifying apparatus.

7. A method according to claim 1 or 2, wherein the certifying apparatus can receive data from many different source devices.

8. A method according to claim 1, further comprising authenticating a connection between said source device and said certifying apparatus using a fixed password recognized by said certifying apparatus; and establishing a secure channel between said source device and said certifying apparatus by using a said hash value received by said certifying apparatus together with a public key of said certifying apparatus to generate a session key for said secure channel.

9. A method according to claim 1, further comprising establishing an encrypted channel between said remote device and said certifying apparatus, wherein said certifying apparatus and said remote device include tamper resistant hardware, and wherein said encrypted channel comprises a secure tunnel between said remote device and said certifying apparatus such that keys used for the tunnel are controlled by said tamper resistant hardware and do not appear in clear outside said certifying apparatus.

10. A method of certifying electronic data supplied by a user, the method comprising:
    establishing a secure connection between a source device operated by the user and a certifying apparatus;
    sending data supplied by the user from the source device to be received by the certifying apparatus;
    receiving at the source device a password direct from a remote device without the password being received at the certifying apparatus;
    sending a hash value of said password from said source device direct to said certifying apparatus, with a further hash value of said password being received at said certifying apparatus direct from the remote device so that the further hash value from the remote device is compared by the certifying apparatus with the hash value from the user to thereby validate the user if the further hash value matches the hash value without the certifying apparatus receiving said password; and
    receiving at the source device a version of the data from the certifying apparatus certified as originating from the user, using information unique to the user.

11. A method according to claim 10, further comprising the step of incorporating a certified version of the data into further data to be sent to a third party device.

12. A method according to claim 10 or 11, wherein the certifying apparatus holds information unique to the user to carry out the certification.

13. A method according to claim 12, wherein the unique information is the private key of a public key/private key pair specific to the user.

14. A method according to claim 12, wherein the unique information is a digital signature specific to the user.

15. A method according to claim 10 or 11, wherein the data to be certified is a hash value of a message.

16. A method according to claim 10, further comprising authenticating a connection between said source device and said certifying apparatus using a fixed password recognized by said certifying apparatus; and establishing a secure channel between said source device and said certifying apparatus by using said hash value together with a public key of said certifying apparatus to generate a session key for said secure channel.

17. A method according to claim 1 or 10, wherein the certifying apparatus comprises a signature server.

18. A method according to claim 1 or 10, wherein the certifying apparatus comprises a plurality of signature servers using secret sharing to store individual portions of a private key of a user, and wherein the signature is generated based on individual portions of a private key of a user stored on some or all of the signature servers.

19. A method according to claim 17, wherein the certifying apparatus further comprises one or several authentication servers.

20. A method according to claim 1 or 10, wherein the source device comprises a workstation.

21. A method according to claim 1 or 10, wherein the source device comprises an interactive television.

22. A method according to claim 1 or 10, wherein the source device and certifying apparatus establish authenticated individual connections between the source device and one or several servers of the certifying apparatus before and during transfer of the data to be certified.

23. A method according to claim 22, wherein the connection is encrypted.

24. A method according to claim 22, wherein the source device supplies a token to the certifying apparatus for authentication.

25. A method according to claim 24, wherein the token is supplied to the user or source device by the certifying apparatus via an alternate channel to the authenticated connection.

26. A method according to claim 25, wherein the alternate channel is a mobile telephone network.

27. A method according to claim 26, wherein the token is distributed as a Short Message Service message.

28. A method according to claim 24, wherein the token is a fixed password.

29. A method according to claim 24, wherein the token is a one-time password.

30. A method according to claim 24, wherein the token is unique to a transaction.

31. A method according to claim 24, wherein the token is stored on a portable device.

32. A method according to claim 24, wherein more than one type of token may authenticate the user or source device to one or several servers at the certifying apparatus.

33. A method according to claim 22, wherein the method operates by authenticating the user regardless of the source to provide a first level of security, and operates by authenticating the user and source device to provide a second level of security.

34. A method according to claim 25, wherein the certifying apparatus certifies the data with different unique elements, dependent upon the type of token used to authenticate the user or source device.

35. A method according to claim 1 or 10, wherein validation data for validating the data to be certified is received from a remote device before the data is certified.

36. A method according to claim 1 or 10, further comprising the certifying apparatus sending the request to the remote device after receiving a request to certify data.

37. A method according to claim 20 further comprising establishing a communication channel between the workstation and the remote device.

38. A method for use in data certification, comprising:
receiving the data to be certified at a certifying apparatus from a source device;
sending a request for user identification data to an authentication server via a secure tunnel from tamper resistant hardware of said certifying apparatus to tamper resistant hardware of said authentication server, wherein said secure tunnel comprises an encrypted and authenticated communication link; and wherein said
user identification data request is sent in the form of a challenge from the authentication device direct to a said user;
receiving, at said certifying apparatus, a response to the user identification data request which is an encryption of said challenge direct from said user and receiving, at said certifying apparatus, a derived version of said response via the secure tunnel direct from said authentication server;
validating, at said certifying apparatus, the user if the response to the user identification data request matches the derived version of said response from the authentication server;
certifying the electronic data supplied by the user at the certifying apparatus with one or more elements of information secure to the certifying apparatus, said elements being unique to the user; and
outputting the data so certified from the certifying apparatus, for passing to a recipient device;
wherein the elements of secure information certify that the supplier of the data is the user.

39. A method according to claim 38, wherein the request and derived version of the identification are transferred via a different communication method to the identification data.

40. A computer apparatus for use in data certification, the apparatus comprising:
a program memory storing instructions for controlling a processor; and
a processor for reading and implementing the instructions stored in the program memory;
wherein the program instructions stored in the program memory comprise instructions for controlling the processor to carry out the following steps:
receiving data supplied by the user to be certified at a certifying apparatus from a source device;
sending a request to a remote device instructing the remote device to send a password to the user wherein
the password is sent from the remote device direct to the user without the password being received at the certifying apparatus;
receiving, at the certifying apparatus direct from the remote device, a hash value derived from the password;
receiving, at the certifying apparatus direct from the user, a further hash value derived from the password;
comparing, at the certifying apparatus without receiving said password, the further hash value from the user with the hash value from the remote device;
validating the user if the further hash value from the user matches the hash value from the remote device;
certifying the data at the certifying apparatus with one or more elements of information secure to the certifying apparatus, said elements being unique to the user if the further hash value matches the hash value derived from the remote device; and
outputting the data so certified from the certifying apparatus, for passing to a recipient device;
wherein the elements of secure information certify that the supplier of the data is the user.

41. A computer apparatus for certifying data as originating from a user, the apparatus comprising:
a program memory storing instructions for controlling a processor; and
a processor for reading and implementing the instructions stored in the program memory;

wherein the program instructions stored in the program memory comprise instructions for controlling the processor to carry out the following steps:

receiving the data to be certified at a certifying apparatus from a source device;

sending a request for user identification data to an authentication server via a secure tunnel from tamper resistant hardware of said certifying apparatus to tamper resistant hardware of said authentication server, wherein said secure tunnel comprises an encrypted and authenticated communication link; and wherein said user identification data request is sent in the form of a challenge from the authentication device direct to a said user;

receiving, at said certifying apparatus, a response to the user identification data request which is an encryption of said challenge direct from said user and receiving, at said certifying apparatus, a derived version of said response via the secure tunnel direct from said authentication server;

validating, at said certifying apparatus, the user if the response to the user identification data request matches the derived version of said response from the authentication server;

certifying the electronic data supplied by the user at the certifying apparatus with one or more elements of information secure to the certifying apparatus, said elements being unique to the user; and outputting the data so certified from the certifying apparatus, for passing to a recipient device;

wherein the elements of secure information certify that the supplier of the data is the user.

42. A data certifying apparatus, comprising:
a signing device adapted to certify electronic data received from a remote source device as originating from a user, wherein the certifying apparatus is arranged to
receive data from the source device,
certify the data as belonging to the user, using information stored in the certifying apparatus and cryptographic techniques, said information being unique to the user, and
send the certified data to a recipient device and
wherein the certifying apparatus is arranged to
send a request to a further remote device instructing the further remote device to send a password direct to the user without the password being received at the certifying apparatus;
receive a hash value derived from the password direct from the further remote device;
receive a further hash value derived from the password direct from the user;
compare, without receiving said password, the further hash value from the user with the hash value from the further remote device;
validate the user if the further hash value from the user matches the hash value from the remote device; and
certify the data to be certified if the further hash value from the user data matches the hash value from the further remote device.

43. A certifying apparatus according to claim 42, wherein the recipient device is the source device.

44. A certifying apparatus according to claim 42, wherein the recipient device is a third party device.

45. A data certifying apparatus according to claim 42 or 43, wherein the source device and certifying apparatus are arranged to establish an authenticated connection between them before and during transfer of the data to be certified.

46. A data certifying apparatus according to claim 45, wherein the source device and certifying apparatus are arranged such that the connection between them is encrypted.

47. A data certifying apparatus according to claim 45, wherein the source device is arranged to supply a token to the certifying apparatus for authentication.

48. A data certifying apparatus according to claim 47, wherein the authentication device is arranged to supply the token to the user or source via an alternate channel to the authenticated connection.

49. A data certifying apparatus according to claim 47, wherein the token is a fixed password.

50. A data certifying apparatus according to claim 47, wherein the token is a one-time password.

51. A data certifying apparatus according to claim 47, wherein the authentication device is arranged to supply the token to the user or source device via a mobile telephone network.

52. A data certifying apparatus according to claim 50, wherein the authentication device is arranged to supply the token to the user or source device via a Short Message Service message.

53. A data certifying apparatus according to claim 47, wherein authentication device is arranged to supply a unique token for each transaction.

54. A data certifying apparatus according to claim 47, wherein the token is stored on a portable device.

55. A data certifying apparatus according to claim 47, wherein the certifying apparatus is arranged to use more than one type of token to authenticate the user or source device.

56. A data certifying apparatus according to claim 55, wherein the data certifying apparatus is arranged to operate by authenticating the user regardless of the source device to provide a first level of security and to operate by authenticating the user and the source device to provide a second level of security higher than the first level of security.

57. The data certifying apparatus according to claim 47, wherein the certifying apparatus is arranged to certify the data with different unique elements, dependent upon the type of token used to authenticate the user or source device.

58. A data certifying apparatus according to claim 42 or 43, wherein the certifying apparatus comprises a signature server.

59. A data certifying apparatus according to claim 58, wherein the certifying apparatus comprises a plurality of signature servers, each signature server being arranged to use secret sharing to store individual shares of a private key of a user, wherein, the signature generated.

60. A data certifying apparatus according to claim 58, wherein the certifying apparatus further comprises an authentication server.

61. A data certifying apparatus according to claim 42 or 43, wherein the source device comprises a workstation.

62. A data certifying apparatus according to claim 42 or 43, wherein the source device comprises an interactive television.

63. Apparatus according to claim 42, further adapted to authenticate a connection between said source device and said certifying apparatus using a fixed password recognized by said certifying apparatus; to establish a secure channel between said source device and said certifying apparatus by using said hash value received by said certifying apparatus together with a public key of said certifying apparatus to generate a session key for said secure channel.

64. Apparatus according to claim 42, further adapted to establish an encrypted channel between said remote device and said certifying apparatus, wherein said certifying apparatus and said remote device include tamper resistant hardware, and wherein said encrypted channel comprises a secure tunnel between said remote device and said certifying apparatus such that keys used for the tunnel are controlled by said tamper resistant hardware and do not appear in clear outside said certifying apparatus.

65. An apparatus for use in data certification, comprising:

data certifying apparatus, the data certifying apparatus comprising a signing device adapted to certify electronic data received from a remote source device as originating from a user, wherein the certifying apparatus is arranged to receive data from the source device, certify the data as belonging to the user, using information stored in the certifying apparatus and cryptographic techniques, said information being unique to the user, and send the certified data to a recipient device; and an authentication server, said authentication server and said data certifying apparatus each having tamper resistant hardware, said tamper resistant hardware of said authentication server and said tamper resistant hardware of said data certifying apparatus being connected by a secure tunnel, wherein said secure tunnel comprises an encrypted and authenticated communications link; and wherein said data certifying apparatus is configured to send a request for user authentication to said authentication server via said secure tunnel;

said authentication server is configured to receive said request from said data certifying apparatus via said secure tunnel and to supply said user with a user identification data request in the form of a challenge;

said data certifying apparatus is configured to receive a response which is an encryption of said challenge direct from said user; and said authentication server is configured to supply a derived version of said response to the data certifying apparatus via said secure tunnel whereby said data certifying apparatus validates said user if the response to the user identification data request matches the derived version of said response.

66. An apparatus according to claim 65, wherein the receiving means and further supplying means are arranged to operate via a different communication method to the supplying means.

67. A method of certifying electronic data supplied by a user, the method comprising:

establishing a secure connection between a source device and a certifying apparatus comprising a signature server storing a private key specific to the user and an authentication server;

sending the data from the source device to be received by the certifying apparatus;

receiving a password from a token device which shares an individual key with the authentication server;

sending a hash value of said password to said certifying apparatus for verification of the user by said certifying apparatus; and receiving at the source device a version of the data from the certifying apparatus certified as originating from the user by digitally signing at the signature server with the user's private key on behalf of the user without the user's private key being transmitted from the signature server.

68. A computer apparatus for use in data certification, the apparatus comprising:

a program memory storing instructions for controlling a processor; and a processor for reading and implementing the instructions stored in the program memory;

wherein the program instructions stored in the program memory comprise instructions for controlling the processor to carry out the following steps:

establishing a secure connection between a source device operated by the user and a certifying apparatus;

sending data supplied by the user from the source device to be received by the certifying apparatus;

receiving at the source device a password direct from a remote device without the password being received at the certifying apparatus;

sending a hash value of said password from said source device direct to said certifying apparatus, with a further hash value of said password being received at said certifying apparatus direct from the remote device so that the further hash value from the remote device is compared by the certifying apparatus with the hash value from the user to thereby validate the user if the further hash value matches the hash value without the certifying apparatus receiving said password; and receiving at the source device a version of the data from the certifying apparatus certified as originating from the user, using information unique to the user.

* * * * *